United States Patent
Piret (12)

(10) Patent No.: US 6,226,259 B1
(45) Date of Patent: May 1, 2001

(54) DEVICE AND METHOD FOR TRANSMITTING INFORMATION DEVICE AND METHOD FOR PROCESSING INFORMATION

(75) Inventor: Philippe Piret, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/048,097

(22) Filed: Mar. 6, 1998

(30) Foreign Application Priority Data

Apr. 29, 1997 (FR) .................................................. 97 05285

(51) Int. Cl.[7] .................................................. H04J 13/00
(52) U.S. Cl. .................................................. 370/208; 375/286
(58) Field of Search ................................ 370/208, 319, 370/320, 335, 342, 382, 465, 479; 375/286, 289

(56) References Cited

U.S. PATENT DOCUMENTS

| | | | |
|---|---|---|---|
| 5,341,396 | * | 8/1994 | Higgins et al. ...................... 375/206 |
| 5,471,497 | * | 11/1995 | Zehavi ................................. 375/142 |
| 5,602,833 | * | 2/1997 | Zehavi ................................. 370/209 |
| 5,668,806 | | 9/1997 | Arai et al. ........................... 370/342 |

FOREIGN PATENT DOCUMENTS

| | | |
|---|---|---|
| 0 622 920 A1 | 11/1994 | (EP) . |
| 0 687 074 A2 | 12/1995 | (EP) . |
| 9636144 | 11/1996 | (WO) . |
| 9638944 | 12/1996 | (WO) . |

* cited by examiner

Primary Examiner—Hassan Kizou
Assistant Examiner—Ahmed Elallam
(74) Attorney, Agent, or Firm—Fitzpatrick, Cella, Harper & Scinto

(57) ABSTRACT

A device for transmitting sequences of information by modulating a physical quantity includes a transformation unit for transforming sequences of information adapted to associate, with each sequence of information, an intermediate sequence of n intermediate symbols each able to take a first set of different values; a transformation unit for transforming intermediate sequences by taking into account a second set of values whose cardinal number is strictly less than that of the first set, and associating with each element of the first set an element of the second set referred to as a modulator number; and a modulator adapted to modulate the physical quantity by the numbers in each sequence of modulation numbers.

30 Claims, 9 Drawing Sheets

DEVICE AND METHOD FOR TRANSMITTING INFORMATION DEVICE AND METHOD FOR PROCESSING INFORMATION

The present invention concerns a device and a method for transmitting information and a device and a method for processing information.

It applies in particular to the transmission of information by modulation of electric signals transmitted on a channel, for example by radio means. Even more especially, the invention applies to an improvement to the devices and methods presented in the European patent applications EP-94 400 936.4 filed on Apr. 29, 1994 and EP-95 303693.6 filed on May 31, 1995.

By way of explanation, let the case be considered in which the information to be transmitted appears as an n-uple of sequences of symbols in a finite alphabet. These sequences will be referred to hereinafter as information sequences, even though they can represent redundancies designed to correct errors affecting information associated with these redundancies.

These sequences are supplied to a transmission device, also called an "encoder" hereinafter, which produces, from these sequences, the electric signal to be transmitted on the channel.

It can be advantageous for this output signal to occupy a spread-out frequency band, in comparison with the sole frequency f supplying sequences, and for the energy transmitted in this frequency band to be on average uniformly distributed in this frequency band.

The spectrum-spreading methods disclosed in the document EP-94 400 936.4 cited above produce signals whose amplitude can, at certain moments, be too high.

This is because, according to these methods, each of the information sequences, being able to be represented by a sequence of symbols able to take the values +1 and −1, enters the encoder at the rate of n symbols per period T, equal to 1/f. By using a Hadamard function, derived from square matrices whose elements can take only the values +1 and −1, a signal is produced to modulate a carrier in the time interval in question, an interval of duration T.

By way of example, if a Hadamard function is used which is based on a matrix having 8 rows and 8 columns, the time interval is divided into 8 sub-intervals of equal time (of durations equal to T/8). The signal emitted during the i-th of these sub-intervals is equal to the product of the i-th column of the Hadamard matrix and the row including the eight symbols of the sequence transmitted, each symbol taking one of the values +1 and −1.

On receipt of the corresponding signals, which may be affected by errors, a new Hadamard function identical to that effected in the encoder is effected and the sign of the successive elements of the resulting sequence gives the values of the estimated symbol sequence.

This method presents the following drawbacks:
on the one hand, the number of different values is equal to the number of symbols in each sequence, plus one. This large number of levels of modulation of the electric signal makes precise estimation of the levels received relatively difficult,
on the other hand, the largest modulation values are much less probable than the smallest values, and
furthermore, the maximum level of energy to be transmitted grows proportionally to the square of the average energy transmitted.

The invention aims to overcome these drawbacks. To this end, according to a first aspect, the invention relates to a device for transmitting sequences of information, by modulating a physical quantity, having a means of transforming sequences of information adapted to associate, with each sequence of information, a so-called "intermediate" sequence of n so-called "intermediate" symbols each able to take a first set of different values, characterised in that it has:
a means of transforming intermediate sequences taking into account a second set of values whose cardinal number is strictly less than that of the first set, and associating with each element of the first set an element of the second set referred to as the "modulation number" and
a modulator adapted to modulate the physical quantity by the numbers in each sequence of modulation numbers.

Correlatively, according to a second aspect, the invention relates to a method of transmitting sequences of information, by modulating a physical quantity, including a step of transforming sequences of information during which, with each sequence of information, there is associated a so-called "intermediate" sequence of n so-called "intermediate" symbols each able to take a first set of different values, characterised in that it includes:
a step of transforming intermediate sequences taking into account a second set of values whose cardinal number is strictly less than that of the first set, during which there is associated with each element of the first set an element of the second set referred to as the "modulation number" and
a modulation step during which the physical quantity is modulated by the numbers in each sequence of modulation numbers.

By means of these provisions, the number of different levels of modulation of the physical quantity is less than the number of different symbols able to form the information sequence. When the values of the highest levels are, statistically, the rarest, and when these values are mapped to low modulation values, the invention makes it possible to reduce significantly the maximum energy emitted by the modulator, without reducing to the same extent the differences between distinct sequences.

According to particular characteristics:
the sequences of information having k items of information each able to take two different values, the means of transforming sequences of information is adapted to use a sub-matrix of k rows of a Hadamard matrix of dimensions n x n, to represent each sequence of information by an intermediate sequence of n intermediate symbols each able to take k+1 different values,
the sequences of information having k items of information each able to take two different values, during the step of transforming sequences of information, a sub-matrix of k rows of a Hadamard matrix of dimensions n×n is used, to represent each sequence of information by an intermediate sequence of n intermediate symbols each able to take k+1 different values,
the means of transforming sequences of information is adapted to cause the said sub-matrix to work on sequences of numbers able to take only the values +1 and −1, and/or during the step of transforming sequences of information, the said sub-matrix is made to work on sequences of numbers able to take only the values +1 and −1.

By means of these provisions, the present invention applies to transmission methods and devices exhibiting characteristics of spectrum spreading and, in particular, to improvements to the devices and methods presented in European patent applications EP-94 400 936.4 filed on Apr. 29, 1994 and EP-95 303693.6 filed on May 31, 1995.

According to other particular characteristics:
the values of the modulation numbers are lower than a first predetermined threshold and the means of transforming intermediate sequences is adapted to associate with each intermediate number higher than the said first threshold a number lower than the said first threshold, the values of the modulation numbers are lower than a first predetermined threshold and, during the step of transforming intermediate sequences, there is associated with each intermediate number higher than the said first threshold a number lower than the said first threshold, the values of the modulation numbers are higher than a second predetermined threshold and the means of transforming intermediate sequences is adapted to associate with each intermediate number lower than the said second threshold a number higher than the said second threshold, the values of the modulation numbers are higher than a second predetermined threshold and, during the step of transforming intermediate sequences, there is associated with each intermediate number lower than the said second threshold a number higher than the said second threshold, the values of the modulation numbers forming the second set, the means of transforming intermediate sequences is adapted to use a predetermined constant number and to associate, with each intermediate number whose value does not belong to the said predetermined set, a number belonging to the said set, adding or subtracting the constant number to or from the said intermediate number, as many times as required, and/or the values of the modulation numbers forming the second set, during the step of transforming intermediate sequences, a predetermined constant number is used and there is associated, with each intermediate number whose value does not belong to the said predetermined set, a number belonging to the said set, adding or subtracting the constant number to or from the said intermediate number, as many times as required.

By means of each of these provisions, the transformation of intermediate sequences is particularly simple and can be performed using simple, reliable and economical means.

According to a third aspect, the invention relates to a device for processing information represented by a physical quantity modulated by sequences of n so-called "modulation" numbers, having a demodulator adapted to demodulate the physical quantity and to supply sequences of n so-called "demodulation" numbers, characterised in that it has:

a first means of transforming sequences of demodulation numbers adapted to use a Hadamard matrix of n rows and of n columns to associate, with each sequence of demodulation numbers, a so-called "transformed" sequence of n so-called "transformed" numbers, a classification means, adapted to attribute a class to each transformed sequence, taking account of the transformed numbers in the said transformed sequence, and a second means of transforming transformed sequences adapted to take account of the class of each transformed sequence to replace each transformed number with an estimated item of information.

Correlatively, according to a fourth aspect, the invention relates to a method of processing information represented by a physical quantity modulated by sequences of n so-called "modulation" numbers able to take t different values, having a demodulation step, during which the physical quantity is demodulated and sequences of n so-called "demodulation" numbers are supplied, characterised in that it includes:

a first step of transforming sequences of demodulation numbers, during which with each sequence of demodulation numbers there is associated a so-called "transformed" sequence of so-called "transformed" numbers each able to take at least t+1 different values, a classification step, during which a class is attributed to each transformed sequence, taking account of the transformed numbers in the said transformed sequence, and a second step of transforming transformed sequences, during which account is taken of the class of each transformed sequence to replace each transformed number with an estimated item of information.

By means of these provisions, the transmitted items of information, represented by the demodulation sequences, are identified firstly by a classification of a transformed sequence corresponding to each sequence, taking account of the so-called "transformed" numbers, and then by a transformation of the transformed sequences taking into account the class attributed to the said transformed sequence.

In general, the sequences of modulation numbers have their own manner of organisation. They cannot take all possible values and, in order to differentiate them, it is necessary to recognise the manner in which they have been generated, which corresponds to a particular class. Once the class has been determined, by using the first transformation of demodulation sequences, the second transformation of demodulation sequences supplies an item of estimated information assumed to be identical to the item of information transmitted.

According to particular characteristics:

the first transformation means is adapted to use matrix calculation, during the first transformation step, matrix calculation is used, the second transformation means is adapted to use a Hadamard matrix of dimensions n×n, during the first transformation step, a Hadamard matrix of dimensions n×n is used, the classification means includes a means of determining maximum value adapted to supply the measurement of the largest of the absolute values of the transformed numbers, the classification step includes an operation of determination of maximum value, during which the measurement of the largest of the absolute values of the transformed numbers is supplied, the classification means includes a means of calculating distance adapted to supply a measurement of distance between transformed sequences and families of sequences of predetermined numbers, the classification step includes an operation of calculating distance, during which a measurement of distance between sequences of transformed numbers and families of sequences of predetermined numbers is supplied, the second transformation means is adapted to replace each transformed number with an item of binary information, and/or during the second transformation step, each transformed number is replaced with an item of binary information.

By means of each of these arrangements, the classification means, on the one hand, and the second transformation means, on the other hand, are particularly simple, reliable and economical to use.

The description which follows makes it easier to understand the advantages, aims and characteristics of the invention, in relation to the accompanying drawings in which.

In general terms, the embodiment of the transmission device described and depicted proposes to subtract or add, as many times as required, a predetermined quantity to the signals, the absolute value of whose amplitude exceeds a predetermined threshold value to obtain an amplitude whose absolute value is less than the said threshold value.

Figure 1:
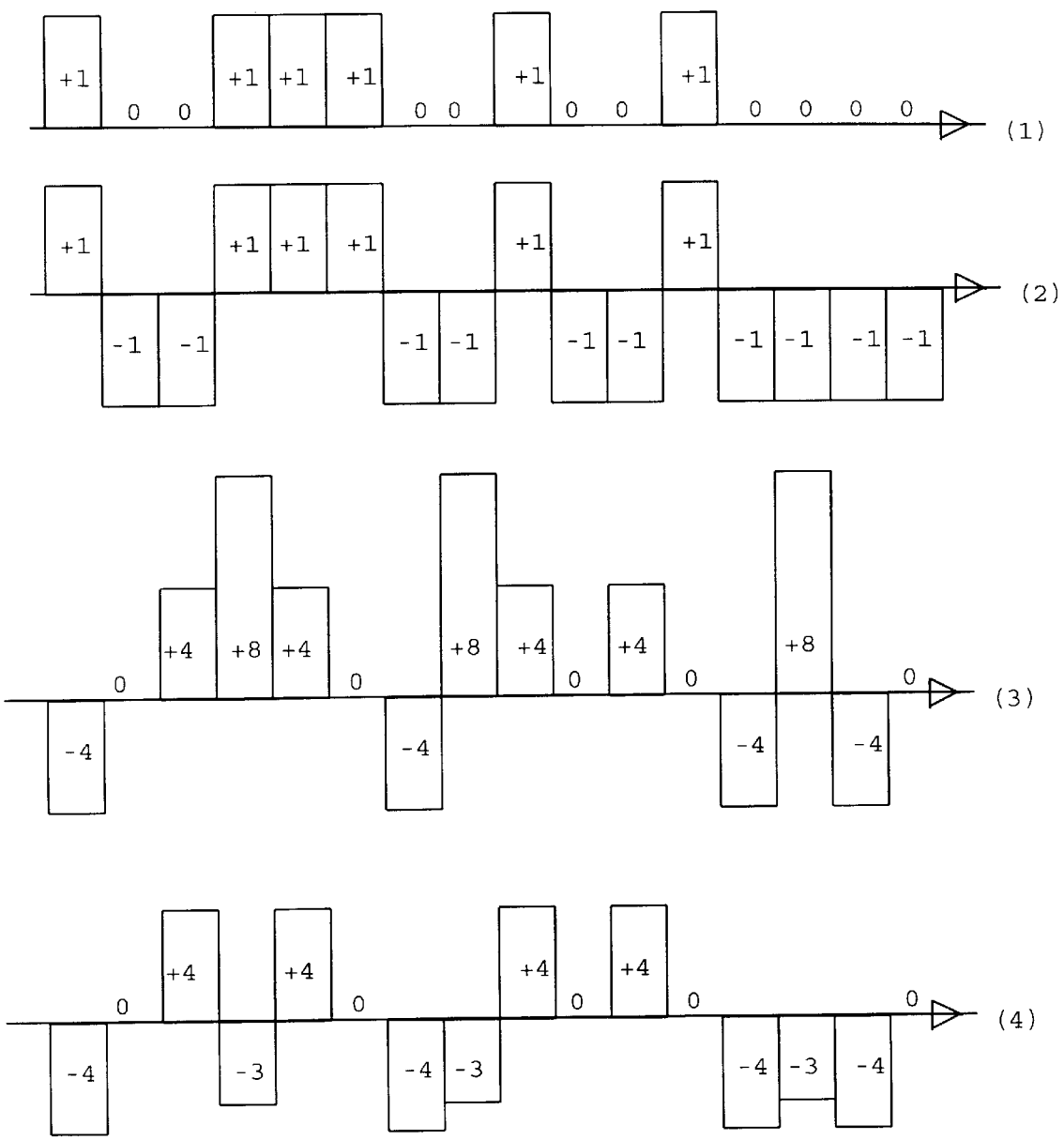
FIG. 1 depicts a sequence of binary information to be transmitted, a sequence of elements of a row matrix corresponding to the said information, a so-called "intermediate" sequence of intermediate symbols representing the said binary information and a sequence of numerical values referred to as "modulation numbers", mapped to the values of the symbols of the intermediate sequence.

In FIG. 1 there are successively depicted, from top to bottom:

a sequence of a number k of binary information items to be transmitted, k having a value of sixteen in this case, whose binary values are, in this case:

$$+1\ 0\ 0+1+1+1\ 0\ 0+1\ 0\ 0+1\ 0\ 0\ 0\ 0 \qquad (1)$$

the elements of a matrix line whose elements correspond to the binary information to be transmitted:

$$+1-1-1+1+1+1-1-1+1-1-1+1-1-1-1-1 \qquad (2)$$

a so-called "intermediate" sequence of n numbers representing the said binary information, n having a value of sixteen in this case, and a sequence of n numerical values referred to as "modulation numbers", mapped to the values of the numbers in the intermediate sequence.

The so-called "intermediate" sequence is obtained by taking the successive values of the matric product of a matrix row corresponding to the k binary information items to be transmitted by a sub-matrix of k rows of a Hadamard matrix H having n=16 rows and n=16 columns.

In the matrix line, the k elements have the binary values which, successively, from left to right, correspond to those of the binary information to be transmitted in the following manner:

to each binary value "+1" of an item of information to be transmitted there corresponds a binary value "+1" of an element of the matrix row and to each binary value "0" of an item of information to be transmitted there corresponds a binary value "−1" of an element of the matrix row.

The matrix row corresponding to the information illustrated in example (1) therefore has elements whose successive values are illustrated in (2).

It should be noted here that other transformations could have been used, in particular that which associates with a value j, the value −1 raised to a power equal to the said value j, $(-1)^j$, 0 then being associated with 1 and 1 with −1.

These elements are depicted in the second line of FIG. 1.

By way of example, the Hadamard matrix H chosen and used in the embodiment of the invention described and depicted is:

$$H = \begin{smallmatrix}
+1 & +1 & +1 & +1 & +1 & +1 & +1 & +1 & +1 & +1 & +1 & +1 & +1 & +1 & +1 & +1 \\
+1 & -1 & +1 & -1 & +1 & -1 & +1 & -1 & +1 & -1 & +1 & -1 & +1 & -1 & +1 & -1 \\
+1 & +1 & -1 & -1 & +1 & +1 & -1 & -1 & +1 & +1 & -1 & -1 & +1 & +1 & -1 & -1 \\
+1 & -1 & -1 & +1 & +1 & -1 & -1 & +1 & +1 & -1 & -1 & +1 & +1 & -1 & -1 & +1 \\
+1 & +1 & +1 & +1 & -1 & -1 & -1 & -1 & +1 & +1 & +1 & +1 & -1 & -1 & -1 & -1 \\
+1 & -1 & +1 & -1 & -1 & +1 & -1 & +1 & +1 & -1 & +1 & -1 & -1 & +1 & -1 & +1 \\
+1 & +1 & -1 & -1 & -1 & -1 & +1 & +1 & +1 & +1 & -1 & -1 & -1 & -1 & +1 & +1 \\
+1 & -1 & -1 & +1 & -1 & +1 & +1 & -1 & +1 & -1 & -1 & +1 & -1 & +1 & +1 & -1 \\
+1 & +1 & +1 & +1 & +1 & +1 & +1 & +1 & -1 & -1 & -1 & -1 & -1 & -1 & -1 & -1 \\
+1 & -1 & +1 & -1 & +1 & -1 & +1 & -1 & -1 & +1 & -1 & +1 & -1 & +1 & -1 & +1 \\
+1 & +1 & -1 & -1 & +1 & +1 & -1 & -1 & -1 & -1 & +1 & +1 & -1 & -1 & +1 & +1 \\
+1 & -1 & -1 & +1 & +1 & -1 & -1 & +1 & -1 & +1 & +1 & -1 & -1 & +1 & +1 & -1 \\
+1 & +1 & +1 & +1 & -1 & -1 & -1 & -1 & -1 & -1 & -1 & -1 & +1 & +1 & +1 & +1 \\
+1 & -1 & +1 & -1 & -1 & +1 & -1 & +1 & -1 & +1 & -1 & +1 & +1 & -1 & +1 & -1 \\
+1 & +1 & -1 & -1 & -1 & -1 & +1 & +1 & -1 & -1 & +1 & +1 & +1 & +1 & -1 & -1 \\
+1 & -1 & -1 & +1 & -1 & +1 & +1 & -1 & -1 & +1 & +1 & -1 & +1 & -1 & -1 & +1
\end{smallmatrix}$$

It may be recalled that a Hadamard matrix is a matrix of elements with a value of +1 or −1, where the product of it and its transpose is a diagonal matrix.

The numerical value of the i-th number of the sequence to be transmitted is equal to the sum of the products, for j going from 1 to k, with k=16 in this case, of the j-th item of binary information of the matrix row and the j-th value of the i-th column of the matrix H.

Thus the value of the fourth number of the sequence to be transmitted is equal to:

$$(+1.+1)+(-1.-1)+(-1.-1)+(+1.+1)+(+1.+1)+(+1.-1)+(-1.-1)+(-1.+1)+(+1.+1)+(-1.-1)+(-1.-1)+(+1.+1)+(-1.+1)+(-1.-1)+(-1.-1)+(-1.+1)=8$$

The sequence of intermediate symbols thus has the following successive values:

$$-4,0,+4,+8,+4,0,-4,+8,+4,0,+4,0,-4,+8,-4,0 \qquad (3)$$

It can easily be shown that the values of the numbers in the sequence are even and can range from −16 to +16.

The sequence of numerical values referred to as "modulation numbers" is obtained by mapping:

each number value whose absolute value is strictly less than five and a half, to itself, and each number value whose absolute value is strictly greater than five and a half to the value whose absolute value is strictly less than five and a half, and which is obtained by adding or subtracting a constant number referred to below as "skip", skip in this case being equal to eleven.

It will be observed that the threshold chosen in this case, which has a value of five and a half, is equal to half the skip.

The values −16, −14, −12, −10, −8, −6, −4, −2, 0, −2, −4, +6, +8, +10, +12, +14, +16 are thus respectively mapped to the values −5, −3, −1, −1, +3, +5, −4, −2, 0, +2, +4, −5, −3, −1, +1, +3, +5.

According to the example illustrated above at (3), the sequence of the modulation numbers is thus equal to:

$$-4,0,+4,-3,+4,0,-4,-3,+4,0,+4,0,-4,-3,-4,0 \qquad (4)$$

It will be noted here that the modulation numbers can take a number t of different values, t having a value of eleven in this case.

Thus, in accordance with a general characteristic, the device for transmitting sequences of information which is the object of the present invention has:

a means of transforming sequences of information adapted to associate, with each sequence of information, a so-called "intermediate" sequence of n so-called "intermediate" symbols each able to take a first set of different values, a means of transforming intermediate sequences taking into account a second set of values whose cardinal number is strictly lower than that of the first set, and associating with each element of the first set an element of the second set referred to as the "modulation number" and a modulator adapted to modulate the physical quantity by the numbers of each sequence of modulation numbers.

Furthermore, in accordance with particular characteristics:

the values of the modulation numbers are lower than a first predetermined threshold, the first threshold having a value of +5.5, and the means of transforming intermediate sequences is adapted to associate with each intermediate number higher than the said first threshold a number lower than the said first threshold, the values of the modulation numbers are higher than a second predetermined threshold, the threshold having a value of −5.5 in this case, and the means of transforming intermediate sequences is adapted to associate with each intermediate number lower than the said second threshold a number higher than the said second threshold, and the values of the modulation numbers forming the second aforementioned set, the means of transforming intermediate sequences is adapted to use a predetermined constant number and to associate with each intermediate number whose value does not belong to the said predetermined set, a number belonging to the said set, adding or subtracting the constant number to the said intermediate number, as many times as required.

It will be noted that the binary information to be transmitted can equally well come from a single source of information or from several sources, from encoding devices supplying redundancies able to correct errors affecting information, or from devices supplying so-called "padding" information of no significance (in the latter case, the word "information" is not to be understood in its mathematical sense, since it corresponds to a symbol of no significance, but in a sense extended to any symbol).

Figure 2:
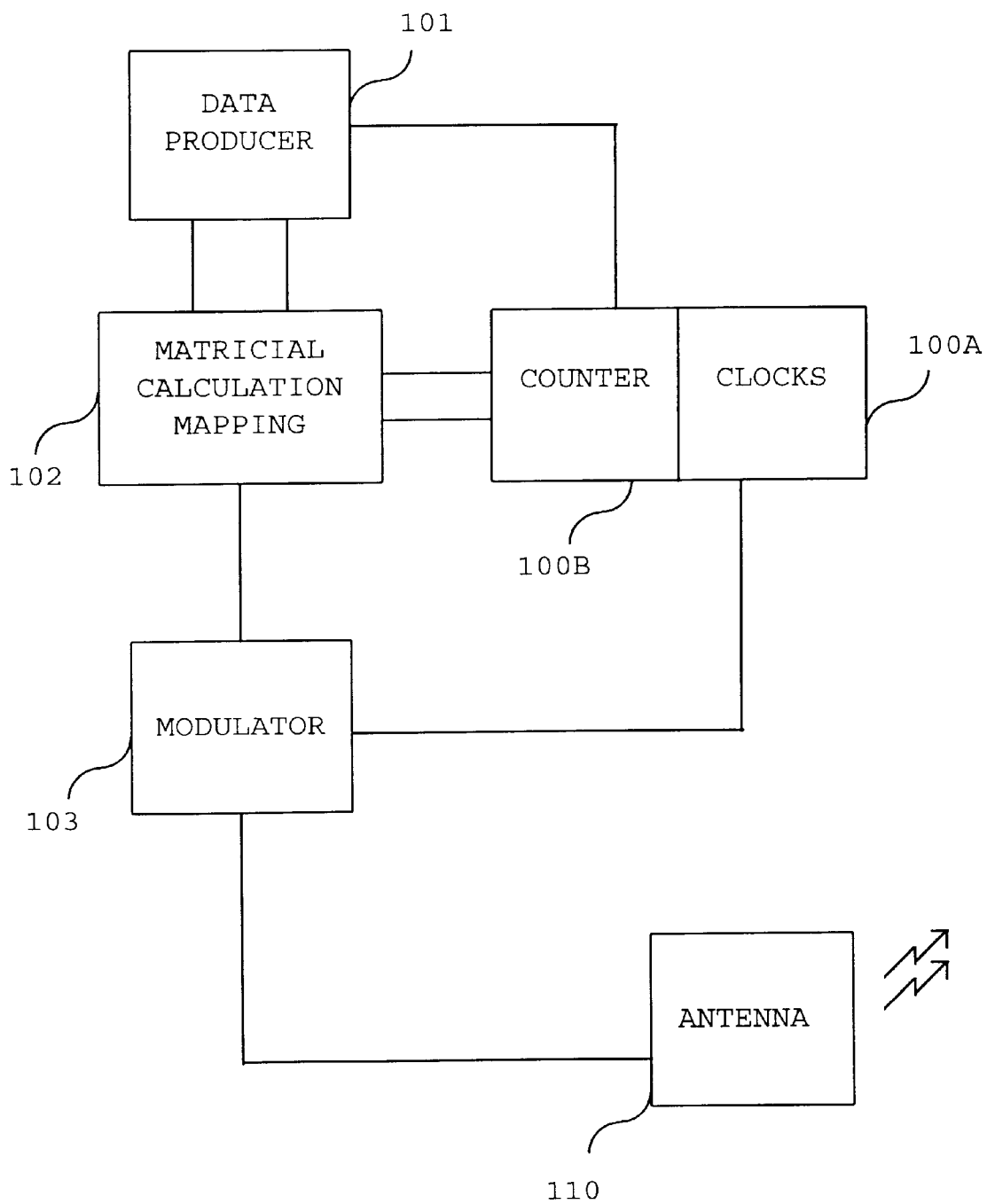
FIG. 2 depicts a functional diagram of an information transmission device according to the present invention.

FIG. 2 depicts the functions used by a transmission device.

A data generator 101, for example consisting of a data storage memory, an information reception system or a system for processing transmitted information, supplies information. In the embodiment described and depicted, the information to be transmitted is supplied in the form of sequences of binary information having k=16 binary information items.

A read-only memory 102 maps each sequence of sixteen binary information items presented at its address port to a succession of n=16 modulation numbers whose values range between −5 and +5. To this end, it operates as a mapping table (known to experts by the English term "look-up table"), the address port receiving, on k=16 of its electrical connections, the binary values of the information to be transmitted and, on four others of its electrical connections, binary values representing the output of a clock pulse counter 100B counting the pulses from one to sixteen.

A clock 100A is associated with the aforementioned counter 100B and times the operation of the various components of this device. The counter 100B delivers only one pulse to the data generator 101 for n=16 counted pulses reaching it from the clock 100A.

Thus the counter 100B associated with the clock 100A supplies the row number of the Hadamard matrix H to which the look-up table corresponds, this look-up table using jointly:

the matrix calculation disclosed above which supplies the value of each number in the intermediate sequence, and a mapping means which associates a modulation number with each intermediate symbol of the intermediate sequence, as disclosed above in relation to FIG. 1.

The output bus of the read-only memory 102 therefore includes in this case four electrical connections used to represent the whole values between −5 and +5 inclusive.

A modulator 103 modulates a physical quantity, in this case an electrical wave, according to the successive values of the numbers in the sequence of modulation numbers, which come to it from the output bus of the read-only memory 102.

An antenna 110 transmits the physical quantity modulated by the modulator 103, in this case in the form of an electromagnetic wave.

It should be noted, furthermore, that the invention applies equally well to the storage of data (storage not depicted) and to the transmission of data (illustrated in FIG. 2).

It should also be observed that FIG. 2 corresponds substantially to a non-programmable electronic circuit. On the other hand, FIG. 3 corresponds to a programmable circuit.

Figure 3:
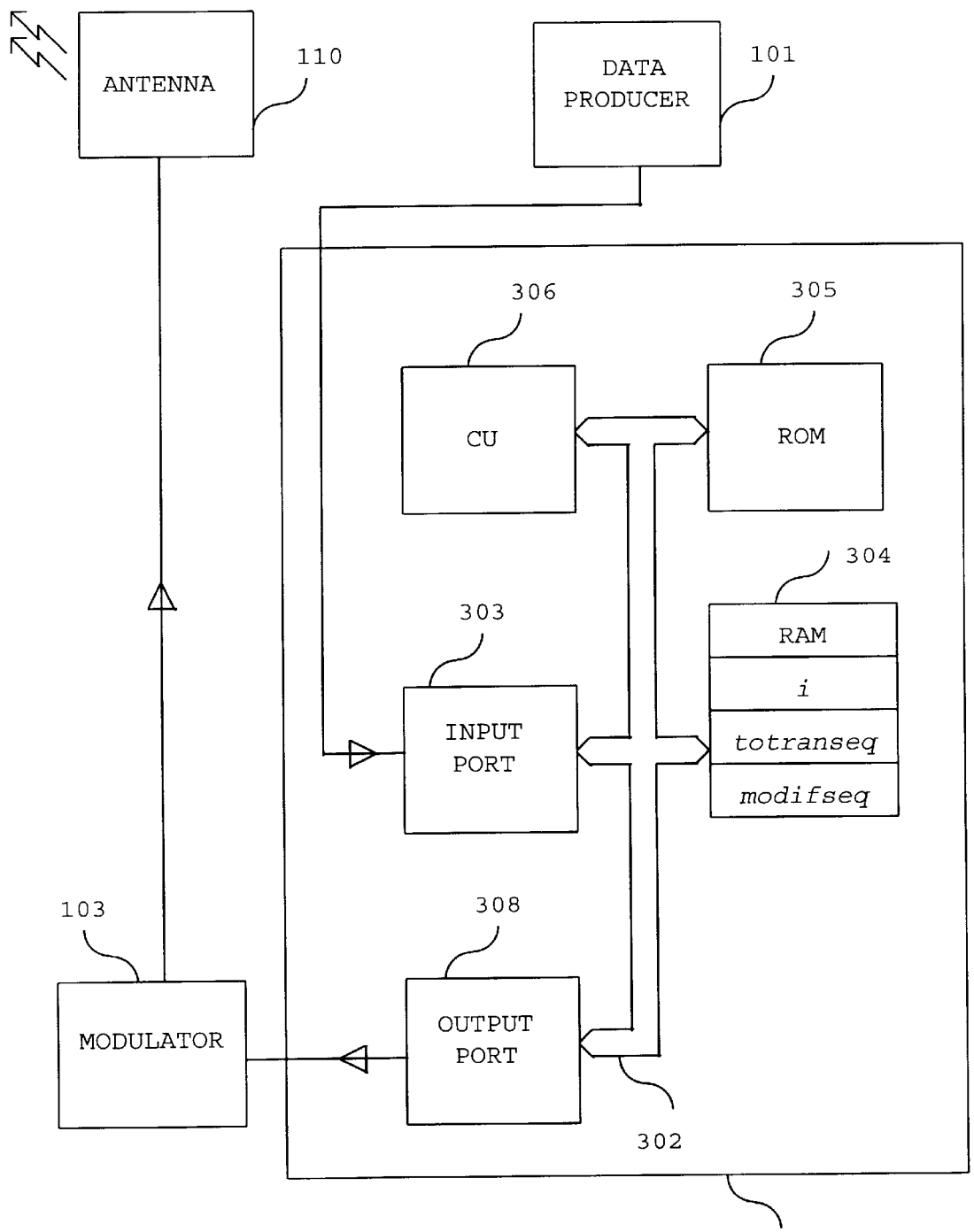
FIG. 3 depicts an information transmission device according to the present invention.

Also, in FIG. 3 there are depicted the main components of an electronic transmission device 301 implementing the present invention. This transmission device has an architecture known in the field of programmable electronic systems, based on the use of components interconnected by a bus 302 and a central unit 306 controlled by a program, a simplified algorithm of which is presented below, in relation to FIGS. 7A, 7B and 7C.

An input port 303 receives the binary information from the data generator 101, and transmits them, under the control of the central unit 306, to a random access memory RAM 304.

The random access memory RAM 304, of a known type, includes registers designed to receive parameters, variables, numerical data and intermediate processing values, which, in order to simplify the description, carry the same name as these registers:

the register i which contains a variable i designed to count operating loops, the register "totransseq" stores the so-called "intermediate" sequence which corresponds to the sixteen intermediate symbols, a sequence calculated according to the matrix calculation disclosed in relation to the third line of FIG. 1 and the register "modifseq" stores the sequence of modulation numbers mapped to the numbers of the sequence totransseq according to the mapping presented in relation to the fourth line of FIG. 1.

A read-only memory ROM 305, of a known type, stores the program which enables the device and, in particular, the central unit 306, to operate. The central unit 306, of a known type, for example consisting of a microcontroller, controls the operation of the main components of the information transmission device.

An output port 308 transmits to the modulator 103 the modulation numbers designed to modulate the physical quantity transmitted. Finally, the modulator 103 is connected to the antenna 110.

Figure 4:
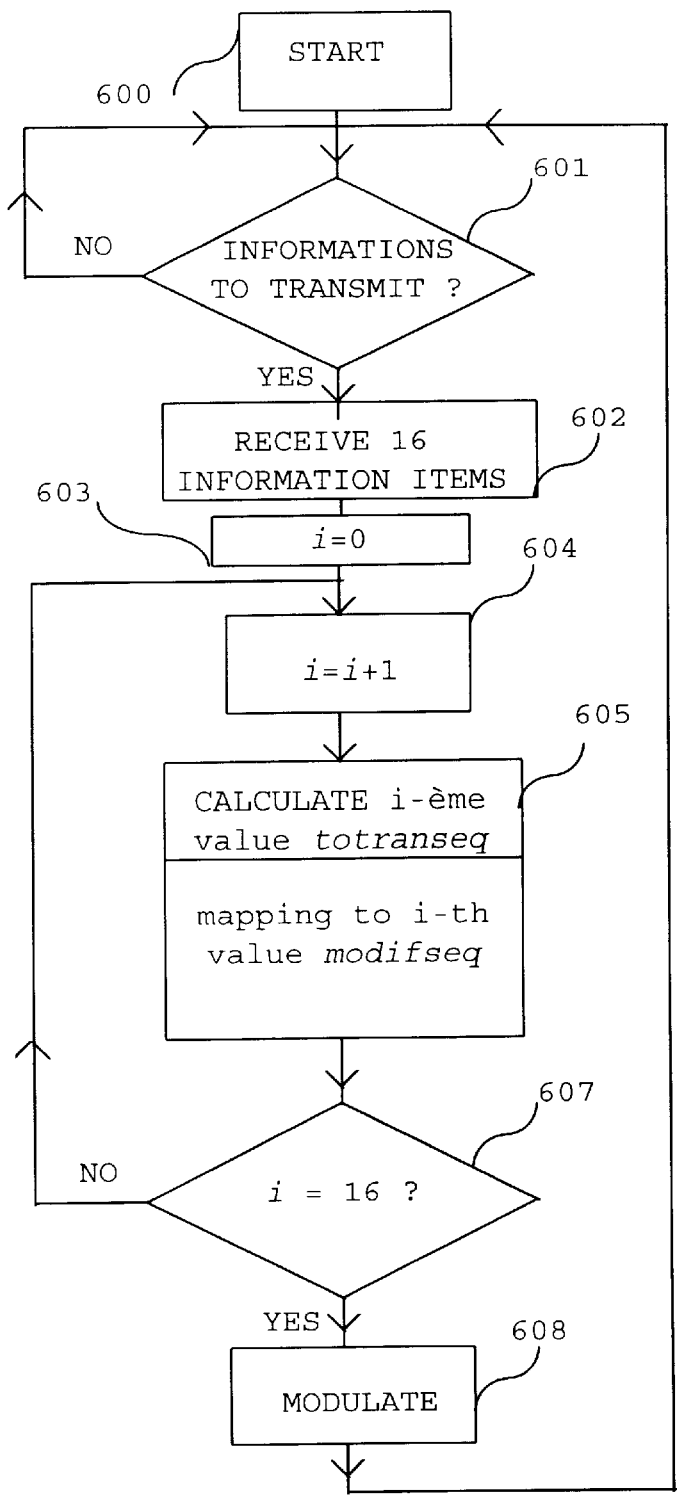
FIG. 4 depicts an algorithm for the operation of the transmission device as illustrated in FIGS. 2 and 3.

FIG. 4 depicts a simplified algorithm of the operation of the transmission device as illustrated in FIG. 3.

From the start of operation 600, the central unit 306 performs the test 601 which determines whether or not a symbol to be transmitted is present on the input port 303. If the result of the test 601 is negative, this test is repeated. If the result of the test 601 is positive, during the operation 602, 16 binary information items to be transmitted are received on the input port 303.

During the operation 603, the variable i is initialised to the numerical value "0". During the operation 604, the variable i is incremented by one unit. During the operation 605, the value of the i-th intermediate symbol of the intermediate sequence totransseq is calculated according to the matrix calculation disclosed in relation to the third row of FIG. 1 and mapped to a modulation number whose value corresponds to that of the corresponding intermediate symbol according to the mapping disclosed in relation to the fourth row of FIG. 1.

The modified value is thus attributed to the i-th number of the sequence of modulation numbers and stored in the register modifseq.

A test 607 determines whether or not the variable i has reached the value 16. If the result of the test 607 is negative, the operation 604 is repeated. If the result of the test 607 is positive, the values of the sequence of intermediate symbols modifseq are successively transmitted to the modulator 103 and modulate a periodical signal transmitted by the antenna 110, during the operation 608. Then the device performs the test 601 once again.

Figure 5:
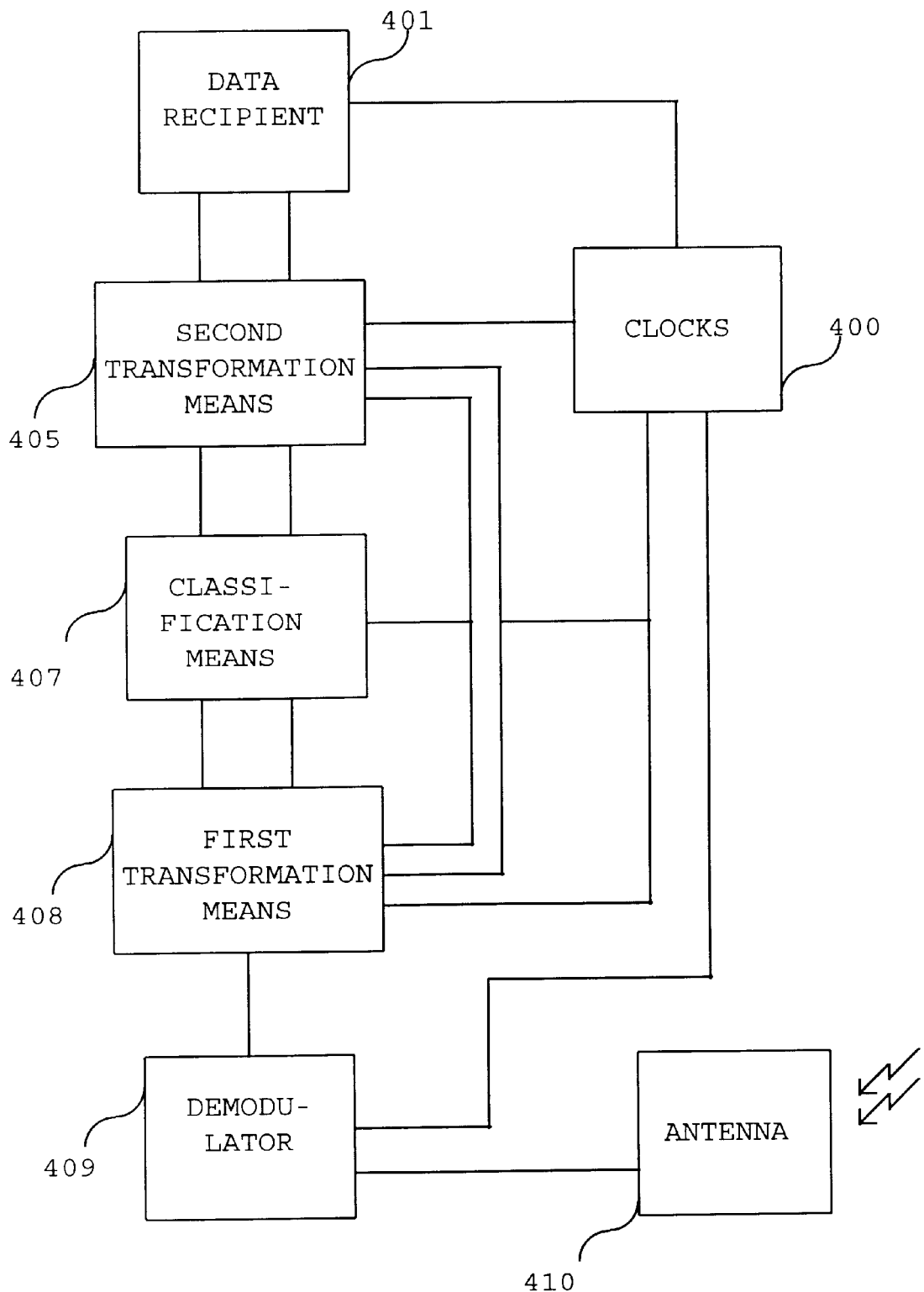
FIG. 5 depicts a functional diagram of an information processing device according to the present invention.

In FIG. 5 are depicted the functional blocks of a device for processing information according to the invention, designed to receive the signals transmitted by the antenna 110 and to estimate the information at the origin of these signals. A receiving antenna 410 receives an electromagnetic wave modulated by the transmitting antenna 110, and transmits it, optionally following amplification, to a demodulator 409.

The demodulator 409 supplies sequences of numbers, referred to as "demodulation numbers", whose values can be any, because of the noise which can affect the transmission, and transmits these sequences of demodulation numbers to a first means of transforming sequences of demodulation numbers 408. The first transformation means 408 is adapted to associate, with each sequence of 16 demodulation numbers, a so-called "transformed" sequence of 16 numbers so-called "transformed" numbers.

In the embodiment described and depicted, the first transformation means 408 produces the matric product of the matrix row formed by the demodulation numbers and the transpose of the Hadamard matrix used in the sending device present in relation to FIGS. 1 to 3.

A classification means 407 is adapted to attribute a class to each transformed sequence, taking account of the transformed numbers of the said transformed sequence.

A second means of transforming transformed sequences 405 is adapted to take account of the class of each transformed sequence in order to replace each transformed number with an estimated item of information.

Thus the estimation is performed of the information items represented by this sequence of numbers, the classification means 407 and the second means of transforming demodulation sequences 405 using rules described below in relation to FIGS. 7A, 7B and 7C.

The estimated information is transmitted by the second transformation means 405 to a data recipient 401. The data recipient 401 can equally be a data storage means, a data processing means or a data transmission means. A clock 400 synchronises the operation of all the functions used by the device.

Figure 6:
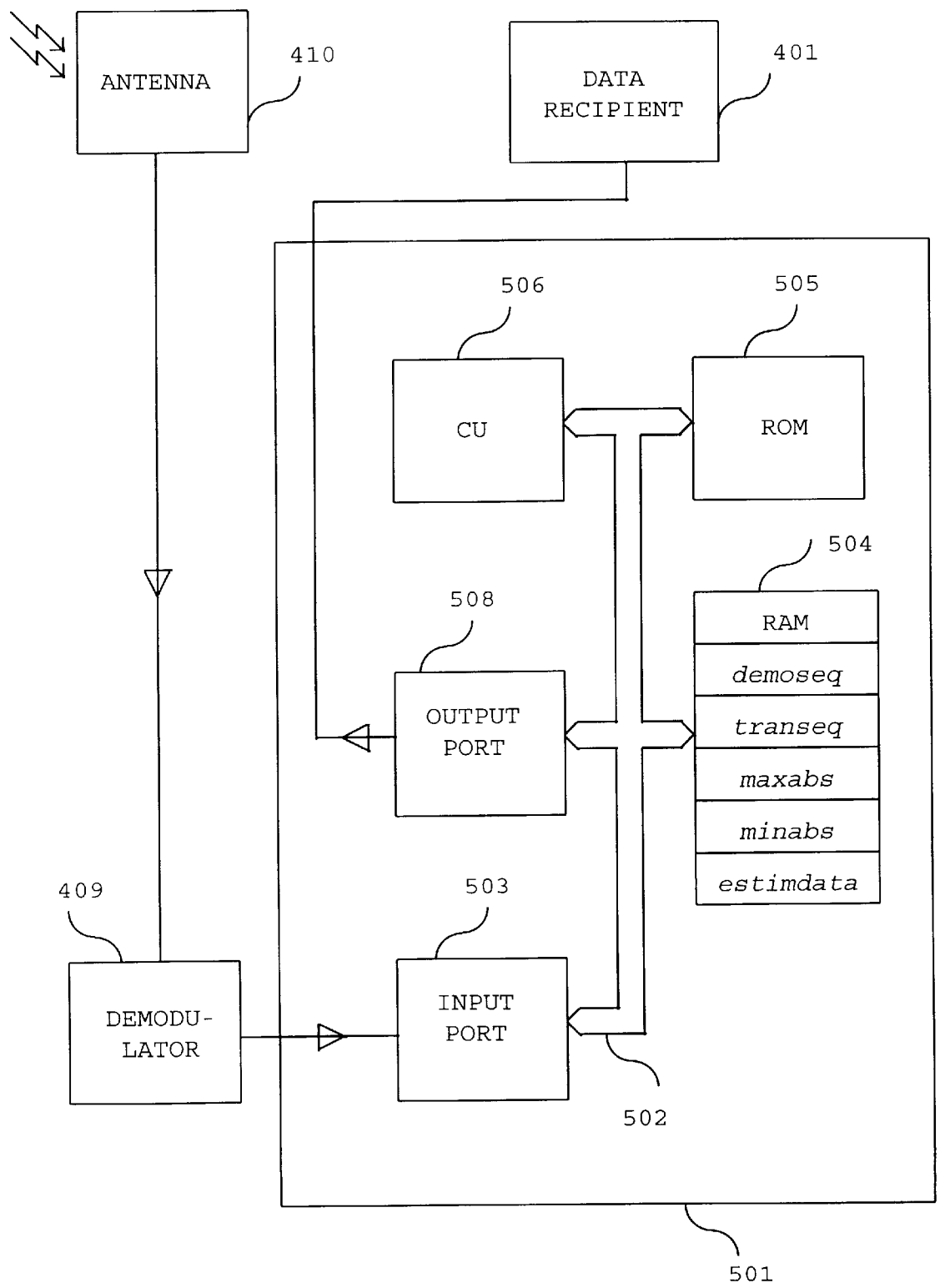
FIG. 6 depicts an information processing device according to the present invention.

In FIG. 6 are depicted the main components of an electronic information processing device 501 implementing the present invention. This processing device has an architecture which is known in the field of programmable electronic systems, based on the use of components interconnected by a bus 502 and on a central unit 506 controlled by a program, a simplified algorithm of which is presented below (FIGS. 7A, 7B and 7C).

An input port 503 receives the binary information coming from the demodulator 409, and transmits them, under the control of the central unit 506, to a random access memory RAM 504.

The random access memory RAM 504, of a known type, includes registers designed to receive parameters, variables, numerical data and intermediate processing values, which, in order to simplify the description, carry the same name as these registers:

demoseq, which stores the sequence of demodulation numbers, transeq, which stores the sequence of transformed numbers, maxabs, which stores the maximum value of the absolute values of the transformed numbers, minabs, which stores the minimum value of the absolute values of the transformed numbers, and estimdata, which stores the sequence of estimated information.

A read-only memory ROM 505, of a known type, stores the program which enables the device and, in particular, the central unit 506, to operate. The central unit 506, of a known type, for example consisting of a microcontroller, controls the operation of the main components of the information transmission device.

An output port 508 transmits the estimated information to the data recipient 401.

Figure 7A:
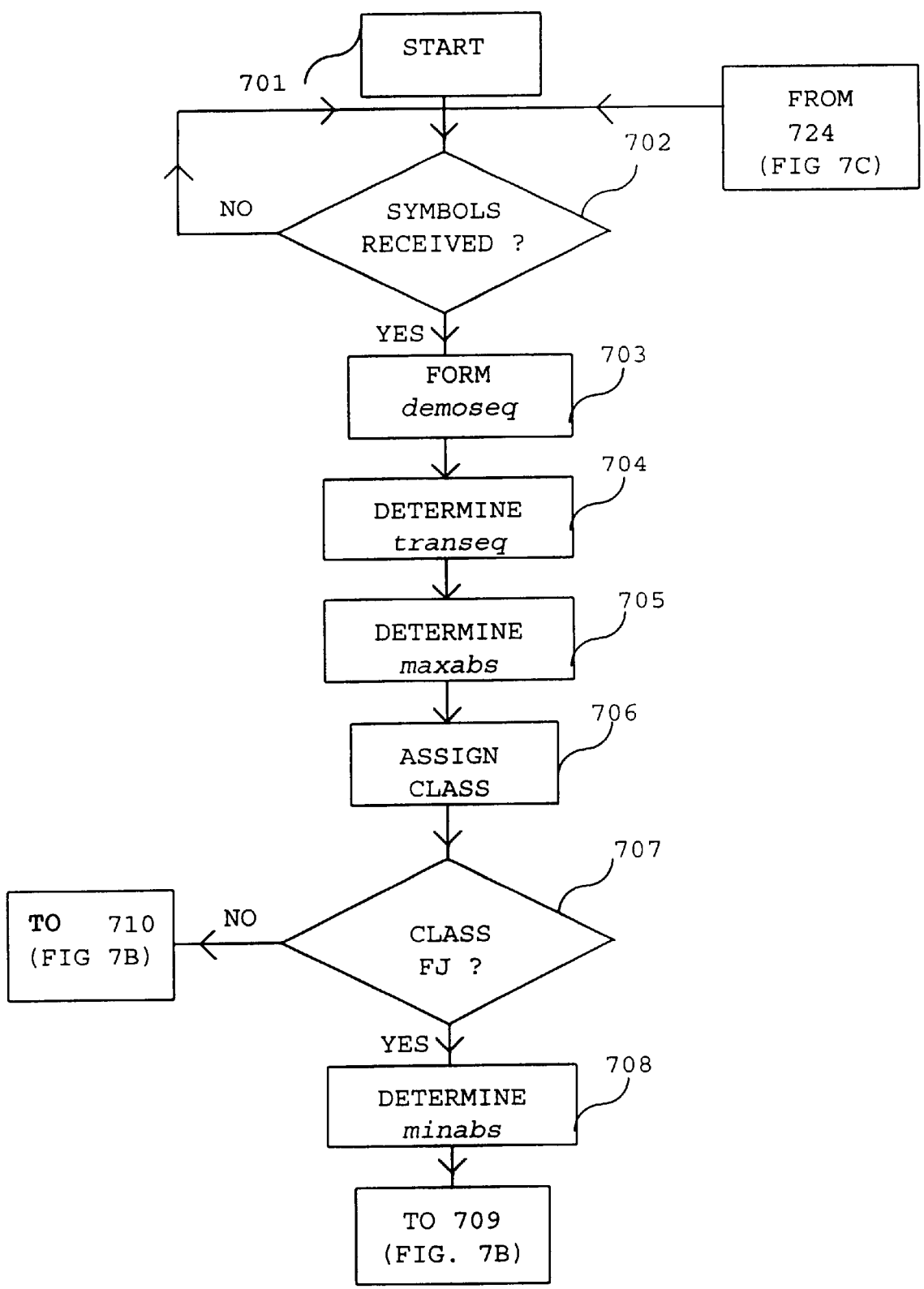
FIGS. 7A, 7B and 7C depict an algorithm for the operation of the processing device as illustrated in FIGS. 5 and 6.
Figure 7B:
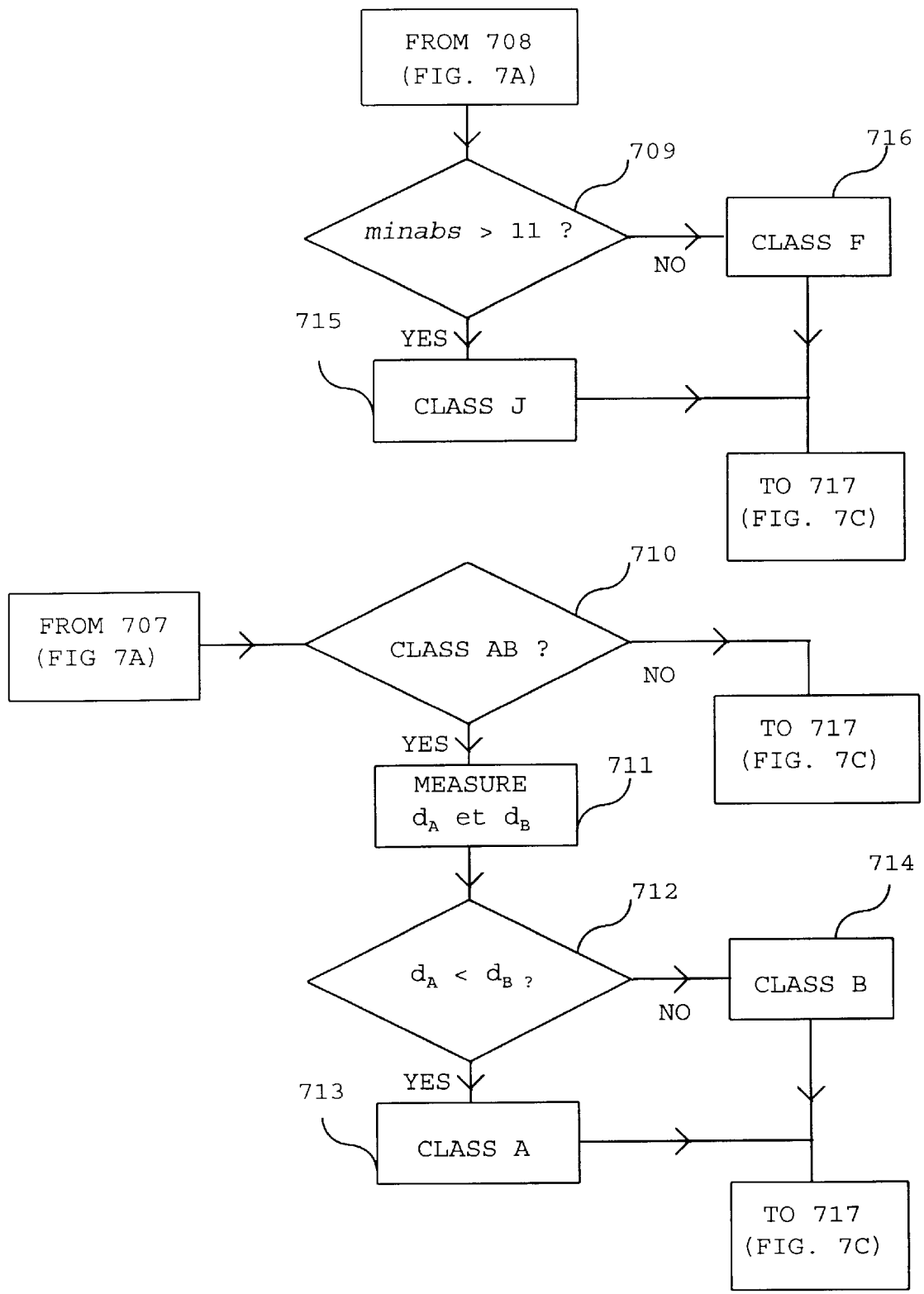
Figure 7C:
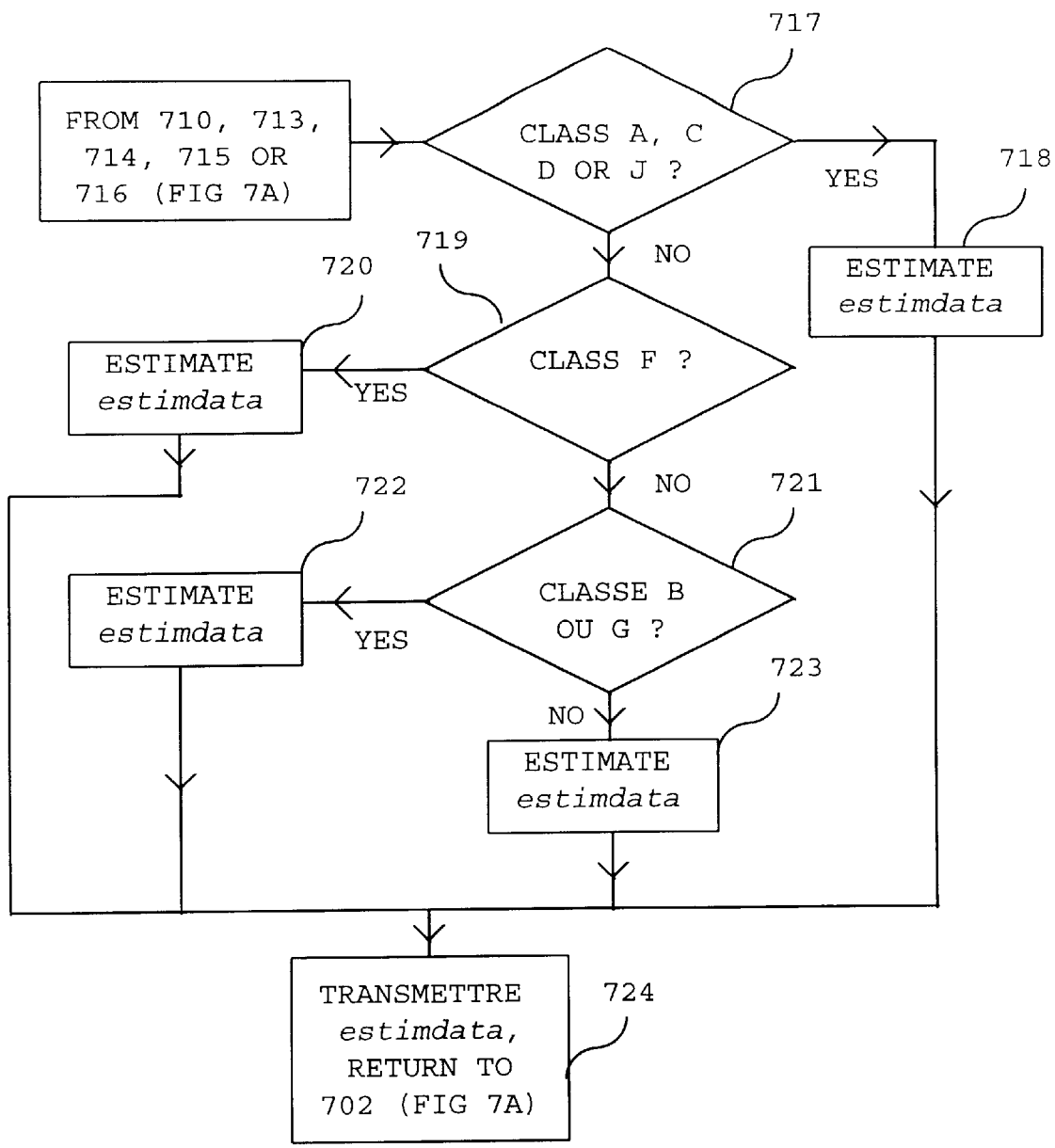

In FIGS. 7A, 7B and 7C, a simplified algorithm of the operation of the processing device as illustrated in FIGS. 5 and 6 is depicted.

From the start of operation 701, the test 702 determines whether or not symbols have been received from the demodulator 409. When the result of the test 702 is negative, that is to say when no symbol has been received, the test 702 is repeated.

The operation 703 consists of awaiting the transmission of sixteen demodulation numbers coming from the demodulator 409, to form a sequence of sixteen demodulation numbers, demoseq, a sequence stored in the register demoseq of the random access memory 504.

The operation 704 then consists of applying to the sixteen demodulation numbers, forming a matrix row of sixteen elements, a matrix product, by using the transposed matrix of the Hadamard matrix presented in FIG. 1. The operation 704 corresponds to the use of the first means of transforming a sequence of demodulation numbers. It makes it possible to form a so-called "transformed" sequence of 16 so-called transformed numbers, a sequence called transeq, s having a value of sixteen in this case, a sequence which is recorded in the register transeq of the random access memory 504.

The operation 705 consists of seeking the highest absolute value maxabs from amongst the absolute values of the transformed numbers, according to techniques known in information processing. The operation 705 supplies this value maxabs to the register maxabs of the random access memory 504.

The operation 706 consists of attributing a class jointly to the sequence of transformed numbers and to the sequence of demodulation numbers from which it comes.

In order to explain the operation 706, it is necessary to analyse the successive transformations of the sequences of intermediate symbols so as to characterise the sequences of transformed numbers, both in the transmission device and in the processing device.

When no noise appears in the transmission of the signals, modulated and then demodulated, the sequences of transformed numbers belong to one of the following classes:

class A: sequences which contain only transformed numbers whose absolute value is equal to 5;

class B: sequences which contain only transformed numbers whose absolute value is equal to 6;

class C: sequences in which the absolute value of one transformed number is equal to 27 and in which the absolute value of the other transformed numbers is equal to 5;

class D: sequences in which the absolute value of two transformed numbers is equal to 27 and in which the absolute value of all the other transformed numbers is equal to 5;

class E: sequences in which the absolute value of one transformed number is equal to 38 and in which the absolute value of all the other transformed numbers is equal to 6;

class F: sequences in which the absolute value of the eight transformed numbers is equal to 16 and in which the absolute value of the other transformed numbers is equal to 6;

class G: sequences in which the absolute value of one transformed number is equal to 50 and in which the absolute value of all the other transformed numbers is equal to 6; and class H: sequences which contain only transformed numbers whose absolute value is equal to 16.

By using intermediate numbers:

between the values 50 and 38 (in this case the number 44), between the values 38 and 27 (in this case the number 32.5), between the values 27 and 16 (in this case the number 21.5) and between the values 16 and 6 (in this case the number 11), the operation 706 attributes the classes according to the following rules:

if maxabs>44 class G, if 44≧maxabs>32.5 class E, if 32.5≧maxabs>21.5 class CD encompassing classes C and D, if 21.5≧maxabs>11 class FJ encompassing classes F and J, and if 11≧maxabs class AB encompassing classes A and B.

It being known that the same processing operations are to be applied to the transformed sequences having the classes C and D, it only remains to distinguish the sequences of the classes F and J, on the one hand, and of the classes A and B, on the other hand.

The test 707 determines whether or not the class attributed during the operation 706 corresponds to the class FJ. When the result of the test 707 is positive, the operation 708 consists of determining the value minabs which corresponds to the minimum value of the absolute values of the transformed numbers of the sequence in question.

The test 709 determines whether the value minabs is higher than the value 11 (median value between 6 and 16 which are the minabs values of the sequences of the classes F and J, respectively, without noise).

When the result of the test 709 is positive, the class attributed to the sequence is class J, operation 715. In the converse case, the class attributed is class F, operation 716.

When the result of the test 707 is negative, the test 710 determines whether the class attributed during the operation 706 is class AB. When the result of the test 710 is positive, the operation 711 consists of:

firstly, arranging in decreasing order the absolute values of R the transformed numbers to form a sequence $t^R$, and then forming the sequences:

$t^A = (5,0,0, \ldots, 0)$ and $t^B (3,3,3,3,0,0, \ldots, 0)$, then, measuring:

on the one hand, the sum of the squares of the differences between the numbers in the sequences $t^R$ and $t^A$, a sum called $d_A$, and on the other hand, the sum of the squares of the differences of the numbers of the sequences $t^R$ and $t^B$, a sum called $d_B$.

Then, the test 712 consists of determining whether or not $d_A$ is lower than $d_B$. When the result of the test 712 is positive, the operation 713 attributes class A to the sequence of transformed numbers, and when the result of the test 712 is negative, the operation 714 attributes class B to the sequence of transformed numbers.

Following the operations 713, 714, 715 and 716, or when the result of the operation 710 is negative, the test 717 determines whether the class attributed to the transformed sequence is one of the classes A, C, D or J. When the result of the test 717 is positive, the operation 718 consists of estimating the sequence of information which was at the origin of the transformed sequence: the value of one element of the estimated sequence of information has a value of +1 when the sign of the corresponding transformed number is positive, and −1 in the opposite case. The sequence of estimated information is then recorded in the register estimdata of the random access memory 504.

When the result of the test 717 is negative, the test 719 determines whether or not the class is F. When the result of the test 719 is positive, during the operation 720, three thresholds, respectively between +16 and +6, between +6 and −6 and between −6 and −16, are used. In choosing the thresholds 11, 0 and −11, the operation 720 estimates the value of each transformed number in the following manner:

when the transformed number is higher than 11 or between 0 and −11, the estimated information has a value of +1, and when the transformed number is lower than −11 or between 0 and +11, the estimated information has a value of −1.

The sequence of estimated information is then recorded in the register estimdata of the random access memory 504.

When the result of the test 719 is negative, the test 721 determines whether or not the class attributed is one of the classes B or G. When the result of the test 721 is positive, the operation 722 consists of estimating the sequence of information which was at the origin of the transformed sequence in the following manner: the value of one element of the estimated sequence of information has a value of −1 when the sign of the corresponding transformed number is positive and +1 in the opposite case.

The sequence of estimated information is then recorded in the register estimdata of the random access memory 504.

When the result of the test 721 is negative, that is to say when the class of the transformed sequence is class E, the operation 723 consists of attributing:

the value +1 to the information of the same ranking in the estimated sequence as the transformed number whose absolute value has a value of maxabs, when the sign of this transformed number is positive, and −1 to this information, in the opposite case, the value +1 to each of the estimated information items of the same ranking in the estimated sequence as a transformed number whose sign is negative, and the value −1 in the opposite case.

The sequence of estimated information is then recorded in the register estimdata of the random access memory 504.

At the end of the operations 718, 720, 722 and 723, the estimated sequence of information is transmitted on the output port 508, and then the test 702 is repeated, during the operation 724.

Thus, the processing of the information represented by sequences of n so-called "modulation" numbers, respectively depicted by n so-called "demodulation" numbers, includes:

a first transformation of sequences of demodulation numbers which uses a Hadamard matrix of n rows and n columns to associate, with each sequence of demodulation numbers, a transformed sequence of 16 so-called transformed numbers each able to take at least t+1 different values, a classification which attributes a class to each sequence of transformed numbers, taking account of the transformed numbers of the said transformed sequence, and a second transformation of transformed sequences which takes account of the class of each transformed sequence to replace each transformed number with an estimated item of information.

It should be noted that the number k can be strictly lower than n, the skip then being selected in order to permit the efficacious implementation of the procedure described above.

Furthermore, although the embodiment described and depicted uses matrices of 16 rows and 16 columns, and sequences of 16 elements, n therefore having the value 16, the invention is easily applicable to cases in which n is a multiple of 4 and, particularly, to cases in which n=8, n=32 and n=64.

Preferably, for the latter values of n, the skip is chosen as follows:

n=8 skip=5
n=32 skip=23
n=64 skip=47.

Persons skilled in the art will easily be able to draw on the method disclosed for the case of n=16 in order to produce a practical embodiment corresponding to the other values of n.

Finally, it should be observed that, when n is a power of 2, the choice of a skip equal to 3 is particularly efficacious.

What is claimed is:

1. A device for transmitting sequences of information by modulating a physical quantity, including a transformer adapted to transform sequences of information, and to associate, with each sequence of information, an intermediate sequence of n intermediate symbols each able to take a first set of difference values, said device comprising:

a transformer adapted to transform intermediate sequences taking into account a second set of values whose cardinal number is strictly less than that of the first set, and to associate with each element of the first set an element of the second set referred to as a modulation number; and a modulator adapted to modulate the physical quantity by numbers in each sequence of modulation numbers.

2. A device according to claim 1, characterised in that, for sequences of information that include k items of information each able to take two different values, said transformer is adapted to use a sub-matrix of k rows of a Hadamard matrix of dimensions n×n to represent each sequence of information by an intermediate sequence of n intermediate symbols each able to take k+1 different values.

3. A device according to claim 2, characterised in that said transformer is adapted to cause the sub-matrix to work on sequences of numbers able to take only values of +1 and −1.

4. A device according to claim 1, characterised in that values of the modulation numbers are lower than a predetermined first threshold, and in that said transformer is adapted to associate with each intermediate number higher than the first threshold a number lower than the first threshold.

5. A device according to claim 1, characterised in that values of the modulation numbers are higher than a predetermined second threshold, and in that said transformer is adapted to associate with each intermediate number lower than the second threshold a number higher than the second threshold.

6. A device according to claim 1, characterised in that, for values of the modulation numbers forming the second set, said transformer is adapted to use a predetermined constant number and to associate, with each intermediate number whose value does not belong to a predetermined set, a number belonging to the predetermined set, adding or subtracting a constant number to or from the intermediate number as many times as required.

7. A method of transmitting sequences of information, by modulating a physical quantity, that includes a step of transforming sequences of information for which, with each sequence of information, there is associated an intermediate sequence of n intermediate symbols each able to take a first set of different values, said method comprising:

a step of transforming intermediate sequences taking into account a second set of values whose cardinal number is strictly less than that of the first set, and associating with each element of the first set an element of the second set referred to as a modulation number; and a step of modulating the physical quantity by numbers in each sequence of modulation numbers.

8. A method according to claim 7, characterised in that, for sequences of information that include k items of information each able to take two different values, said step of transforming sequences of information uses a sub-matrix of k rows of a Hadamard matrix of dimensions n×n to represent each sequence of information by an intermediate sequence of n intermediate symbols each able to take k+1 different values.

9. A method according to claim 8, characterised in that, said step of transforming sequences of information causes the sub-matrix to work on sequences of numbers able to take only values of +1 and −1.

10. A method according to claim 7, characterised in that values of the modulation numbers are lower than a predetermined first threshold, and in that said step of transforming intermediate sequences associates with each intermediate number higher than the first threshold a number lower than the first threshold.

11. A method according to claim 7, characterised in that values of the modulation numbers are higher than a predetermined second threshold, and in that said step of transforming intermediate sequences associates a number higher than the second threshold with each intermediate number lower than the second threshold.

12. A method according to claim 7, characterised in that, for values of the modulation numbers forming the second set, said step of transforming intermediate sequences uses a predetermined constant number and associates, with each intermediate number whose value does not belong to a predetermined set, a number belonging to the predetermined set, the constant number being added to or subtracted from the intermediate number as many times as required.

13. A device for processing information represented by a physical quantity modulated by sequences of n modulation numbers, including a demodulator adapted to demodulate the physical quantity and to supply sequences of n demodulation numbers, said device comprising:
  a first transformer adapted to transform sequences of demodulation numbers using a Hadamark matrix of n rows and n columns, and to associate, with each sequence of demodulation numbers, a transformed sequence of n transformed numbers;
  a classifier adapted to attribute a class to each transformed sequence, taking into account the transformed numbers in the transformed sequence; and
  a second transformer adapted to transform transformed sequences, taking into account the class of each transformed sequence, to replace each transformed number with an estimated item of information.

14. A device according to claim 13, characterised in that said first transformer is adapted to use a matrix calculation.

15. A device according to claim 14, characterised in that said second transformer is adapted to use a Hadamard matrix of dimensions n×n.

16. A device according to claim 13, characterised in that said classifier includes a maximum value calculation unit adapted to determine a maximum value and to supply a largest absolute value of the transformed numbers.

17. A device according to claim 13, characterised in that said classifier includes a distance calculation unit adapted to calculate and to supply a distance between transformed sequences and families of sequences of predetermined numbers.

18. A device according to claim 13, characterised in that said second transformer is adapted to replace each transformed number with an item of binary information.

19. A method of processing information represented by a physical quantity modulated by sequences of n modulation numbers able to take t different values, including a step of demodulating the physical quantity and a step of supplying sequences of n demodulation numbers, said method comprising:
  a step of transforming each sequence of demodulation numbers and associating a transformed sequence of transformed numbers each able to take at least t+1 different values;
  a step of attributing a class to each transformed sequence, taking into account the transformed numbers in the transformed sequence; and
  a step of transforming transformed sequences, taking into account the class of each transformed sequence to replace each transformed number with an estimated item of information.

20. A method according to claim 19, characterised in that said step of transforming demodulation numbers uses a matrix calculation.

21. A method according to claim 20, characterised in that said step of transforming demodulation numbers uses a Hadamard matrix of dimensions n×n.

22. A method according to claim 19, characterised in that said step of attributing a class includes determining a maximum value and supplying a largest absolute value of the transformed numbers.

23. A method according to claim 19, characterised in that said step of attributing a class includes calculating and supplying a distance between sequences of transformed numbers and families of sequences of predetermined numbers.

24. A method according to claim 19, characterised in that said step of transforming transformed sequences replaces each transformed number with an item of binary information.

25. A network, characterised in that it comprises:
  at least one transmission device; and
  at least one processing device according to claim 13, wherein
  each of said at least one transmission device transmits sequences of information by modulating a physical quantity and includes a transformation unit for transforming sequences of information adapted to associate, with each sequence of information, an intermediate sequence of n intermediate symbols each able to take a first set of different values,
  each of said at least one transmission device comprises:
    a transformation unit for transforming intermediate sequences by taking into account a second set of values whose cardinal number is strictly less than that of the first set, and associating with each element of the first set an element of the second set referred to as a modulation number, and
    a modulator adapted to modulate the phys i cal quantity by the numbers in each sequence of modulation numbers, and
  each sequence of modulation numbers processed by a processing device of said at least one processing device is a sequence of modulation numbers supplied by the transformation unit for transforming intermediate sequences of a transmission device of said at least one transmission device.

26. A radio transmitter, characterised in that it includes a transmission device according to claim 1.

27. A system of capturing information that includes a sensor adapted to emit signals representing a physical quantity, said system being characterised in that it includes a transmission device according to claim 1.

28. A radio receiver, characterised in that it includes a processing device according to claim 13.

29. A system of reproducing information adapted to process a physical quantity on a medium, said system being characterised in that it includes an information processing device according to claim 13.

30. A computer, characterised in that it includes an information processing device according to claim 13.

* * * * *

UNITED STATES PATENT AND TRADEMARK OFFICE
CERTIFICATE OF CORRECTION

PATENT NO. : 6,226,259 B1
DATED : May 1, 2001
INVENTOR(S) : Philippe Piret

It is certified that error appears in the above-identified patent and that said Letters Patent is hereby corrected as shown below:

Title page, Item [54] Title, and Column 1,
"INFORMATION" should read -- INFORMATION, --.

Column 15,
Line 28, "Hadamark" should read -- Hadamard --.

Column 16,
Line 43, "phys i cal" should read -- physical --.

Signed and Sealed this

Second Day of April, 2002

Attest:

*Attesting Officer*

JAMES E. ROGAN
*Director of the United States Patent and Trademark Office*